United States Patent
Patel

(10) Patent No.: US 11,430,015 B2
(45) Date of Patent: Aug. 30, 2022

(54) METHODS AND SYSTEMS FOR PERSONALIZED GAMIFICATION OF MEDIA CONTENT

(71) Applicant: Disney Enterprises, Inc., Burbank, CA (US)

(72) Inventor: Mehul Patel, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 769 days.

(21) Appl. No.: 14/872,036

(22) Filed: Sep. 30, 2015

(65) Prior Publication Data

US 2017/0091827 A1 Mar. 30, 2017

(51) Int. Cl.
| | |
|---|---|
| *G06Q 30/00* | (2012.01) |
| *G06Q 30/02* | (2012.01) |
| *A63F 13/61* | (2014.01) |
| *G06F 16/48* | (2019.01) |
| *H04N 21/4784* | (2011.01) |

(52) U.S. Cl.
CPC ......... *G06Q 30/0271* (2013.01); *A63F 13/61* (2014.09); *G06F 16/48* (2019.01); *H04N 21/4784* (2013.01)

(58) Field of Classification Search
CPC ........... G06Q 30/0277; G06Q 30/0269; G06Q 30/02; G06Q 30/0271; A63F 13/61; G06F 16/48; H04N 21/4784
See application file for complete search history.

(56) References Cited

U.S. PATENT DOCUMENTS

| | | | |
|---|---|---|---|
| 7,921,116 | B2 | 4/2011 | Finkelstein et al. |
| 8,046,803 | B1* | 10/2011 | Lee ................... H04N 21/8583 725/60 |
| 8,145,648 | B2 | 3/2012 | Kunjithapatham et al. |
| 8,842,879 | B2 | 9/2014 | Laksono et al. |
| 2004/0137416 | A1 | 7/2004 | Ma et al. |
| 2009/0094113 | A1 | 4/2009 | Berry et al. |
| 2010/0191567 | A1* | 7/2010 | Lee ..................... G06Q 10/063 715/255 |

(Continued)

OTHER PUBLICATIONS

Gutl; Expectations_of_the_generation_NeXt_in_higher_education_Learning_engagement_approaches_in_information_sciences_subjects; IEEE 2015; pp. 205-214; 2015.*

(Continued)

*Primary Examiner* — Radu Andrei
(74) *Attorney, Agent, or Firm* — Patterson + Sheridan, LLP

(57) ABSTRACT

Systems and methods for increasing consumer engagement with a multimedia content distribution system through the use of temporal metadata and gamification techniques. Personalized game-like tasks are created, whereby a consumer is enticed to find and access multimedia content containing a specific content element, or "easter egg," to earn a reward. The specific content element may be identifiable based on temporal metadata tags associated with multimedia content available within the multimedia content distribution system. To further increase the probability of consumer engagement, the easter egg may be personalized based on data unique to the consumer, such as consumer preferences, viewing habits, and previous engagement level with the multimedia content.

22 Claims, 7 Drawing Sheets

(56) References Cited

U.S. PATENT DOCUMENTS

| | | | |
|---|---|---|---|
| 2010/0279762 A1* | 11/2010 | Sohn | A63F 13/67 |
| | | | 463/23 |
| 2010/0325646 A1* | 12/2010 | Alhadeff | G06Q 30/0207 |
| | | | 725/23 |
| 2012/0083330 A1 | 4/2012 | Ocko et al. | |
| 2012/0170902 A1 | 7/2012 | Zhu et al. | |
| 2013/0125161 A1 | 5/2013 | Herby et al. | |
| 2013/0197978 A1* | 8/2013 | Bui | G06Q 30/0207 |
| | | | 705/14.1 |
| 2014/0039991 A1* | 2/2014 | Gates, III | G06Q 30/0269 |
| | | | 705/14.4 |
| 2014/0058811 A1 | 2/2014 | Gorowitz et al. | |
| 2014/0125703 A1* | 5/2014 | Roveta | G11B 27/105 |
| | | | 345/633 |
| 2014/0358260 A1 | 12/2014 | Burgin et al. | |
| 2015/0031426 A1* | 1/2015 | Alloway | A63F 13/67 |
| | | | 463/9 |
| 2016/0379510 A1* | 12/2016 | Rainey | G09B 7/06 |
| | | | 434/362 |

OTHER PUBLICATIONS

Sagl; Integrating Contextual Information; Sensors 2015; pp. 17014-17035; 2015.*

Schultz; Attn-Span; IEEE 2012; pp. 459-461; 2012.*

Mindspace, The Death of Boredom Use Gamification to Engage the Chronically Distracted, http://mindspace.net/gamification/, accessed on Jun. 10, 2015, pp. 1-5.

Parwinr, Video Gamification, http://www.parwinr.com/company_pages/about.html, accessed on Jun. 10, 2015, pp. 1-2.

* cited by examiner

METHODS AND SYSTEMS FOR PERSONALIZED GAMIFICATION OF MEDIA CONTENT

TECHNICAL FIELD

The disclosed technology relates generally to gamification of media content, and more particularly, some embodiments relate to leveraging temporal metadata and machine learning to personalize the gamification experience of media content.

DESCRIPTION OF THE RELATED ART

Metadata is information included within a data file that is not part of the content of the data file, but provides information about the data within the data file. For example, metadata associated with a word processor document may provide information about when the document was created, who created the document, the size of the document, and the number of pages of the document. In other words, metadata is "data about data."

Gamification is a technique wherein game design elements are incorporated into non-game or passive activities in an attempt to increase the enjoyment of such non-game activities. The technique can help increase user engagement, comprehension and learning, and to incentivize physical exercise. One of the most prevalent game design elements utilized in gamification of other activities is the concept of rewards for meeting milestones. Various examples of such rewards include badges, points, or other rewards.

BRIEF SUMMARY OF EMBODIMENTS

According to various embodiments of the disclosed technology, a method is provided for gamifying a user's access of multimedia content through a multimedia content distribution system. Embodiments of the method include retrieving a plurality of consumer-specific data by a gamification system included within the multimedia content distribution system. The consumer-specific data may include various unique information identifying a consumer, such as the consumer's biographical information and viewing habits. The method may further include identifying a plurality of available metadata tags associated with a plurality of multimedia content accessible within a multimedia content distribution system; obtaining prior gamification data comprising one or more data items indicating a consumer's prior actions within the multimedia content distribution system; identifying an applicable difficulty variable; and generating an "easter egg," which represents a specific content element contained within one or more multimedia content accessible within a multimedia content distribution system. The easter egg may be personalized based on the above data types, and an applicable difficulty variable, which may be identified by the gamification engine employing machine learning logic built into the gamification engine.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
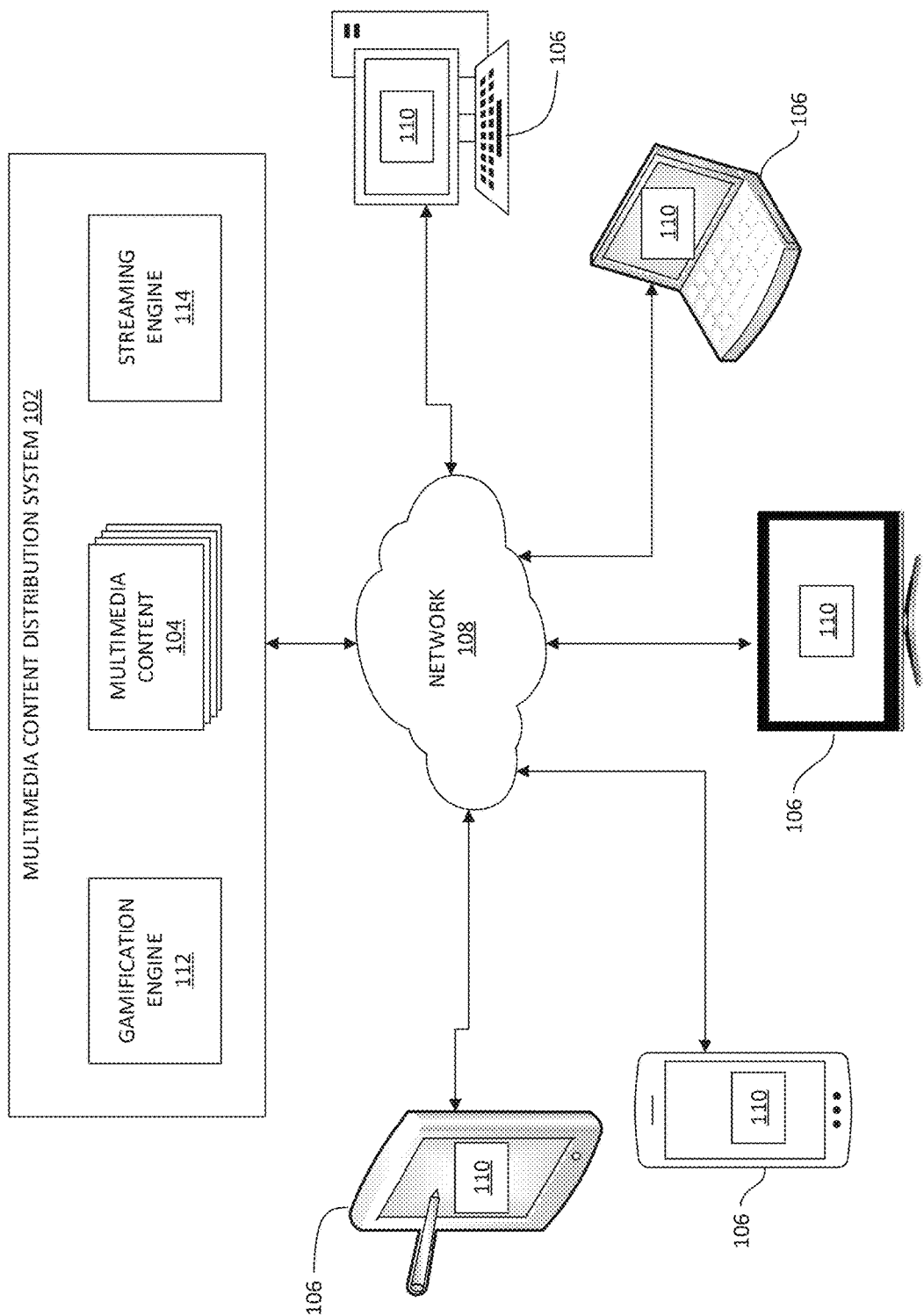
FIG. 1 is an example environment in which embodiments of the technology disclosed herein may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The use of metadata tagging for multimedia content has recently expanded beyond identifying background information regarding the multimedia content on the whole, to tagging additional information regarding the multimedia content. This type of metadata may be referred to as temporal metadata. For example, a movie file may include metadata tags to describe in rich detail the content elements and attributes of each scene in the movie, or even of individual frames of the movie.

Temporal metadata may comprise a whole host of different types of descriptive information about a scene or frame, such as the characters or actors present, the type of action, the time of day, the mood, the dialogue spoken, etc. Temporal metadata also includes a time code reference. The time code reference is an indicator associating the temporal metadata with a particular moment within multimedia content. In various embodiments, the time code reference is an indicator at the frame level of multimedia content.

Temporal metadata enables consumers to engage with multimedia content to an extent not previously possible. However, current uses of the temporal metadata have failed to take full advantage of the potential benefits and enhancement-capabilities of temporal metadata. Many approaches are stuck treating the temporal metadata in a similar fashion as traditional metadata: simply identifying the metadata and identifying the tags.

With the increased options for viewing multimedia content, including multiple different streaming platforms, distributors need to find ways to enhance the viewing or listening experience for the consumer, increasing user engagement with the multimedia and the platform. One such method of increasing consumer engagement is through gamification, where elements of game design are incorporated into non-game activities (e.g., passive activities like watching a movie or listening to an album) to increase consumer interaction with the multimedia content. For example, a content distributor may include rewards for watching a certain number of episodes of a television program using the distributor's platform, encouraging the consumer to seek out those episodes to earn the reward (e.g., a badge or points). To appease to the broadest range of consumers, the task for consumers to complete is usually generic, applying to all consumers equally.

Embodiments of the technology disclosed herein are directed toward systems and methods for increasing consumer engagement with a multimedia content distributor's platform. More particularly, the various embodiments of the technology of the present disclosure utilizes the increasing availability of temporal metadata associated with multimedia content to gamify the viewing or listening experience through the multimedia content distributor's platform. Tasks can be created based on playing multimedia content containing a specific element identified by a temporal metadata tag, instead of generically being tied to the type of multimedia content. Further, embodiments of the technology disclosed herein utilizes information unique to each consumer to personalize the specific element, or "easter egg," for each consumer. In this way, multimedia content distributors can take into account the personal preferences of each consumer in generating the game-like task, further increasing the possibility that the consumer will engage more fully with the platform and "play the game."

FIG. 1 shows an example networked environment in which embodiments of the technology may be implemented. Multimedia content distribution system 102 may comprise one or more content servers operated by a multimedia content distributor in various embodiments. Multimedia content distribution system 102 stores one or more multimedia content 104 that may be distributed to a plurality of user devices 106 over a network 108. Non-limiting examples of multimedia content 104 include: movies; television shows; songs or complete music albums; or audiobooks. For ease of discussion, the technology of the present disclosure will be described with respect to a movie and/or television show playback system. Although discussed with respect to movies and/or television shows, embodiments of the technology are applicable to the types of multimedia content identified above, as well as other digital multimedia content to which metadata tags may be associated.

The type of network 108 may vary, depending on the protocol(s) available to the user devices 106 at a given time. Some non-limiting examples of protocols over which the user devices 106 may connect to the network 108 include: cellular telecommunications protocols, such as GSM, UMTS, CDMA2000, LTE, or WiMAX; wired communications methods, such as cable, DSL, dial-up, or fiber-optic; or wireless communications methods, such as satellite communications, Wi-Fi, Bluetooth, or near-field communication (NFC). The user devices 106 may be able to utilize more than one type of protocol to connect with the network 108 in some embodiments.

User devices 106 may be any number of computing devices, having a memory and processor. Non-limiting examples of user devices 106 are: desktop computer; laptops; tablets; cell phones; smart phones; wearable technology, such as smart watches; PDAs; televisions; or other user devices. A multimedia application 110 running on the user devices 106 enables users to communicate with the multimedia content distribution system 102 through the network 108. The multimedia application 110 may be an application downloaded to the user devices 106 and stored in memory. In some embodiments, the multimedia application 110 may be operating within another program running on a user device 106, such as a web browser.

The technology of the present disclosure is directed towards increasing consumer engagement with multimedia content through a multimedia content distributor's platform. As discussed above, the multimedia content distribution system can create personalized "easter eggs" based on temporal metadata associated with available multimedia content for each consumer, utilizing the temporal metadata tags and consumer-specific data. In this way, each consumer can be provided with a personalized task to complete for increasing the possibility that a consumer will participate in the gamification experience, thereby increasing consumer engagement.

As shown in FIG. 1, a gamification engine 112 and a streaming engine 114 are included within the multimedia content distribution system 102. Through the gamification engine 112, the multimedia content distribution system 102 can transform a normally passive experience, such as watching a movie, into an interactive experience by rewarding consumers for accessing multimedia content 104 that contains specific elements identified by temporal metadata associated with the multimedia content 104. The gamification engine 112 generates an "easter egg" by identifying a specific element that the consumer is encouraged to search for within available multimedia content 104. When a consumer accesses multimedia content 104 including the easter egg, the consumer can earn a reward. Through such incentivizing, the multimedia content distributor can increase consumer engagement with the multimedia content, and encourage consumers to consume such multimedia content 104 through the distributor's multimedia content distribution system 102. The specifics regarding the gamification engine will be discussed with respect to FIG. 3.

When a consumer seeks to access a multimedia content 104 using a multimedia application 110 running on a user device 106, the multimedia content distribution system 102 may stream the multimedia content to the user device 106 via the streaming engine 114. The streaming engine 114 may format the multimedia content 104 for compatibility with the particular consumer device 106 utilized by a consumer to play multimedia content 104. For example, when a consumer requests to play multimedia content 104 via a multimedia application 110 running on a tablet computer, the streaming engine 114 may format the multimedia content 104 to the proper aspect ratio for the device. In various embodiments, the streaming engine 114 may include compression and adaptive multirate components to increase the efficiency of the system by ensuring that the multimedia content 104 is transmitted in an efficient manner. Streaming engine 114 may be capable of transmitting the multimedia content 104 to the consumer devices 106 over a variety of different streaming protocols, as discussed with respect to network 108.

The streaming engine 114 may parse the temporal metadata associated with the accessed multimedia content 104 and identify when the temporal metadata tag associated with the generated easter egg is present. In various embodiments, the streaming engine 114 may provide a notification to the consumer that the game task—viewing multimedia content containing the easter egg—has been achieved. Non-limiting examples of the notification include: a text message displayed on the screen of the user device 106; a visual icon, such as a coin or other visual indication, displayed on the screen of the user device 106 at the time associated with the temporal metadata tag. In some embodiments, the multimedia content distribution system 102 may send a notification to the consumer outside of the multimedia application 110, including but not limited to: email; SMS; MMS; or telephone call.

Figure 2:
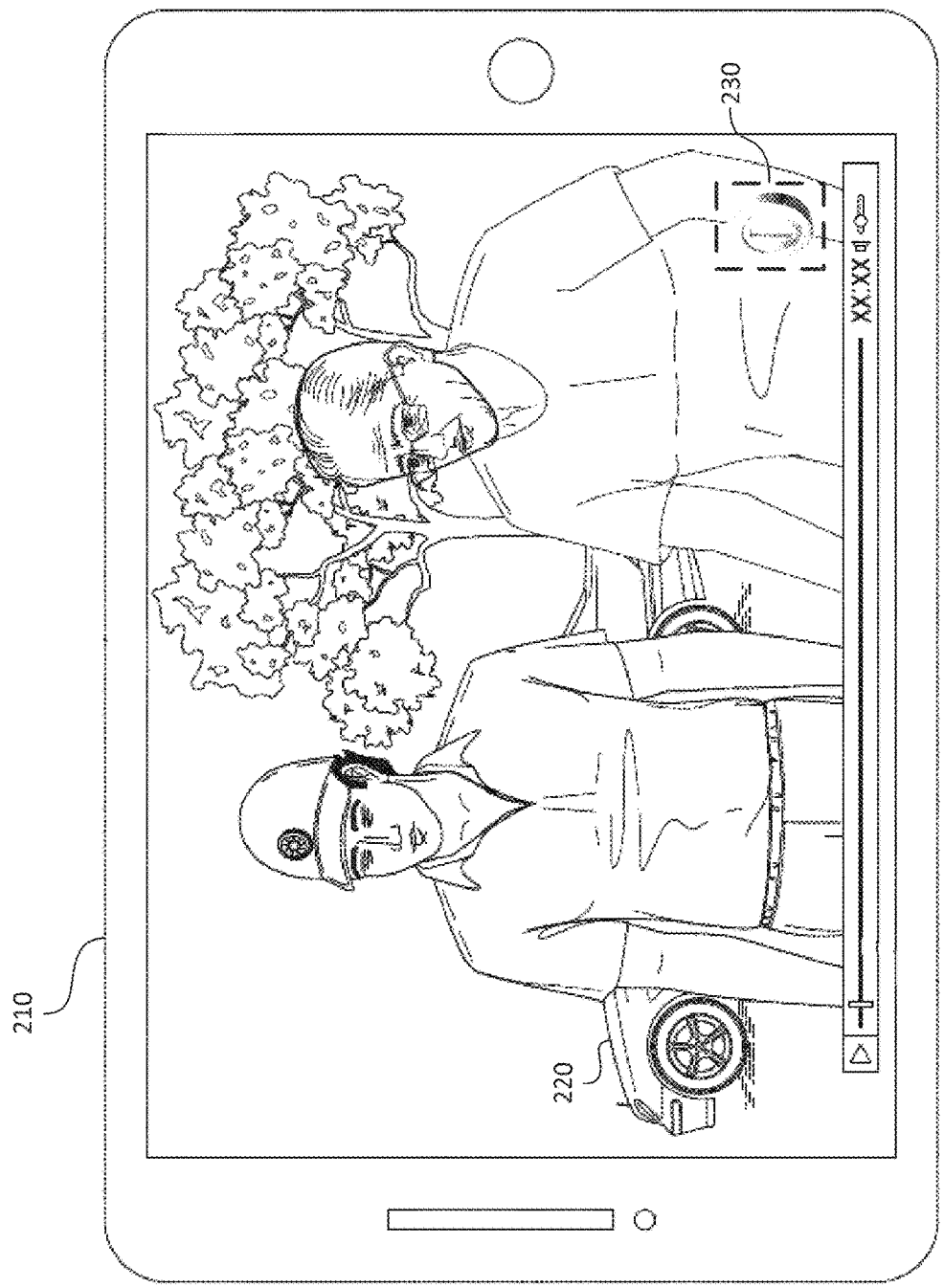
FIG. 2 illustrates an example notification in accordance with embodiments of the technology disclosed herein.

FIG. 2 illustrates an example notification of accomplishment in accordance with embodiments of the technology of the present disclosure. As illustrated in FIG. 2, multimedia content is displayed on the screen of a user device 210. In some embodiments, the multimedia content may be accessed through a multimedia application, such as the multimedia application 110 discussed with respect to FIG. 1. In this example embodiment, assume that the consumer accessing the multimedia content has a preference for motor vehicles, and accordingly the multimedia content distribution system may have gamified the experience by tasking the consumer with viewing multimedia content including a motor vehicle 220. The identification of a motor vehicle 220 is based on the temporal metadata associated with available multimedia content through the multimedia distribution system. When the system identifies that the temporal metadata tag for motor vehicle 220 is associated with the accessed multimedia content, a notification 230 may be displayed on the screen of the user device 210 through the multimedia application. In the illustrated example, the notification 230 is a coin that is displayed on the screen. In some embodiments, the notification 230 may be a textual indication, or may be located somewhere else within the screen. In some embodiments, the notification 230 may only be displayed for a period of time, and disappear after to ensure that the notification 230 does not impact the experience. Other embodiments may keep the notification 230 on the screen until the consumer clicks or interacts with the notification 230, encouraging greater engagement by the consumer.

Figure 3:
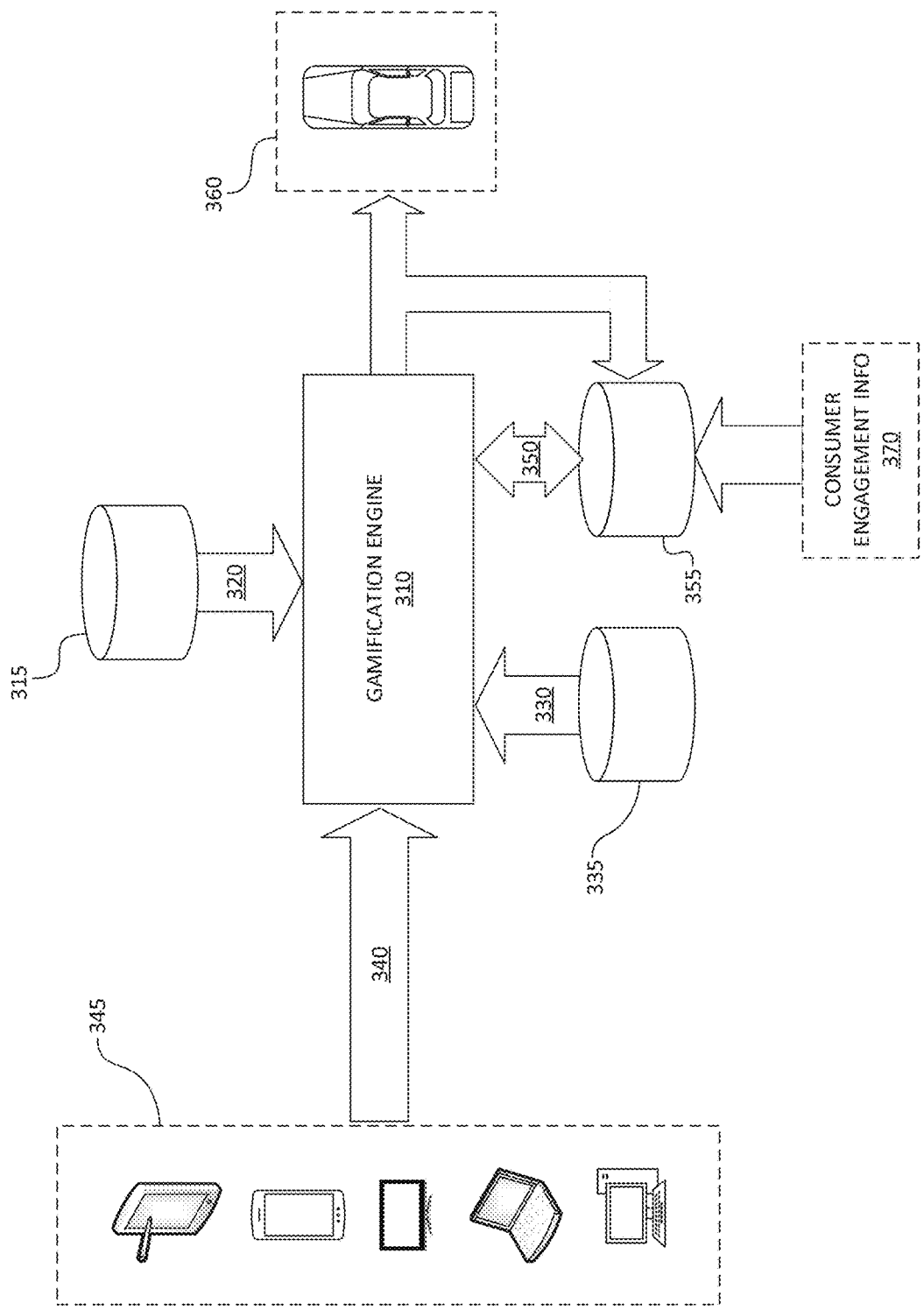
FIG. 3 illustrates an example gamification engine in accordance with embodiments of the technology disclosed herein.

FIG. 3 illustrates an example gamification engine 310 in accordance with embodiments of the technology disclosed herein. As discussed above, the gamification engine 310 incorporates game-design elements into the multimedia content distribution system 300, similar to the multimedia content distribution system 102 discussed with respect to FIG. 1, to increase consumer engagement. One of the limitations of current gamification techniques is the lack of personalization of the gamified experience. Instead of providing a generic task based on the type of multimedia content, embodiments of the technology of the present disclosure generates a personalized task for each consumer to search for and access multimedia content containing a specific element, based on temporal metadata associated with the multimedia content. This personalization is achieved by aggregating several different types of consumer-specific data and personalizing the task to fit the consumer's unique characteristics. In this manner, the effectiveness of the gamification techniques may be enhanced as the tasks are personalized to be more enticing to the consumer. For example, if a consumer prefers action movies, this consumer is less likely to search for and access multimedia content including a fairy's wand.

As illustrated in FIG. 3, the gamification engine 310 aggregates several types of data to generate a personalized easter egg 360. The personalized easter egg 360 represents a specific element contained within one or more multimedia content available within the multimedia content distribution system, such as the multimedia content distribution system 102 discussed with respect to FIG. 1A. In the illustrated embodiment of FIG. 3, the personalized easter egg 360 is a car. One data type used by the gamification engine 310 is available metadata tags 320. Available metadata tags 320 comprise all the categories of temporal metadata available within the multimedia content distribution system employing the gamification engine 310. In this way, the gamification engine 310 can generate a personalized easter egg 360 that is present within at least one multimedia content available in the system. In various embodiments, the available metadata tags 320 may provide the categories of temporal metadata available within the system irrespective of the specific multimedia content that contains such a metadata tag. Other embodiments of the available metadata tags 320 may identify which multimedia content available in the multimedia content distribution system contains the specific type of temporal metadata. In this way, the gamification engine 310 may take into account the specific multimedia content in determining an appropriate easter egg to provide to a particular user. For example, the gamification engine 310 can ensure that the personalized easter egg 360 is contained within a type of multimedia content that a specific consumer is likely to access.

In various embodiments, the available metadata tags 320 may be contained in a category database 315 associated with the multimedia content distribution system. In various embodiments, the category database 315 may be communicatively coupled to a temporal metadata parser (not pictured) within the multimedia content distribution system that analyzes each piece of multimedia content as it is included within the system and sends the updated available metadata tags 320 to the category database 315 for use by the gamification engine 310. In other embodiments, the temporal metadata parser may be part of the gamification engine 310. In various embodiments, an administrator may update the information within the category database 315 remotely to include additional categories of temporal metadata associated with available multimedia content and/or remove categories associated with multimedia content no longer available through the multimedia content distribution system.

The gamification engine 310 may be communicatively coupled to the category database 315. In some embodiments, the category database 315 may be one or more hard drives, servers, or other storage medium. The category database 315 may be independent of the storage device for the available multimedia content in some embodiments, or included within the same storage device. The available metadata tags 320 may be pushed or pulled from the category database 315 to the gamification engine 310, depending on the implementation.

Another type of information utilized by the gamification engine 310 may be consumer-specific data 330. Consumer-specific data 330 may comprise many different types of data unique to each individual consumer. In various embodiments, consumer-specific data 330 may comprise biographical information obtained when the consumer registered to use the multimedia content distribution system. Such biographical information may include the consumer's age, gender, and residence. In some embodiments, the biographical information may include preferences, such as genres of movies that the consumer enjoys, favorite musicians or actors, and non-media related preferences, such as favorite sports or activities.

Consumer-specific data 330 may further include information on multimedia content associated with a particular consumer. In some embodiments, consumer-specific data 330 may include information on multimedia content previously purchased by a consumer, e.g., a multimedia library associated with the consumer. Where available, the consumer-specific data 330 may further include information regarding the consumer's activity within the system, such as multimedia content accessed during a particular period, such as recently viewed movies or music albums. In various embodiments, the consumer-specific data 330 may be stored within a consumer data database 335. The consumer data database 335 may comprise one or more of hard drives, servers, or other storage medium.

The gamification engine 310 may also supplement the consumer-specific data 330 with device-specific data 340. The device-specific data 340 can provide further personalization of the easter egg generated by the gamification engine, taking into account information available from the specific user device 345 through which the consumer is accessing and interacting with the multimedia content distribution system. The device-specific data 340 may include, but is not limited to: location information; information on multimedia accessed by the consumer using the device on the Internet; information on the type of multimedia content available on the user device 345; or information available from other applications related to multimedia content operating on the user device 345.

Another data type aggregated by the gamification engine 310 may be prior gamification data 350. The prior gamification data 350 may include personalized easter eggs 360 generated by the gamification engine 310. In this way, the gamification engine 310 can ensure that the same element is not used for subsequent personalized easter eggs 360. In some embodiments, the prior gamification data 350 may include consumer engagement info 370. In various embodiments, the consumer engagement info 370 may identify whether the consumer has accomplished the prior task (i.e., accessed multimedia content containing the previous personalized easter egg 360), the multimedia content accessed which contained the previous personalized easter egg 360, and/or the period between generation of the previous personalized easter egg 360 and the consumer accessing multimedia containing the previous personalized easter egg 360. In this way, the gamification engine 310 can verify that the consumer has accomplished the previous task before generating a new personalized easter egg 360, or can determine that a predetermined amount of time had passed since the last easter egg generation and generate a fresher personalized easter egg 360 to hopefully increase consumer engagement. In various embodiments, the prior gamification data 350 may be maintained in a history database 355.

By generating a personalized easter egg in this manner, multimedia content distributors can utilized enhanced gamification techniques to increase the probability that each consumer will more fully engage with content through the multimedia content distribution system. First, by focusing on the elements within the multimedia content, as opposed to the type of multimedia content, the multimedia content distributor may take advantage of the increased functionality made possible through temporal metadata tags. By basing the gamification on specific elements, more detailed tasks may be presented, increasing variety in the gaming experience. Moreover, by basing the task on the unique characteristics of each consumer, a multimedia content distributor can increase the probability the consumer will "play the game." A consumer is more likely to participate if the tasks are geared more towards the particular preferences of the consumer, instead of being generic tasks applicable to all consumers irrespective of particular differences in taste or preference.

Figure 4:
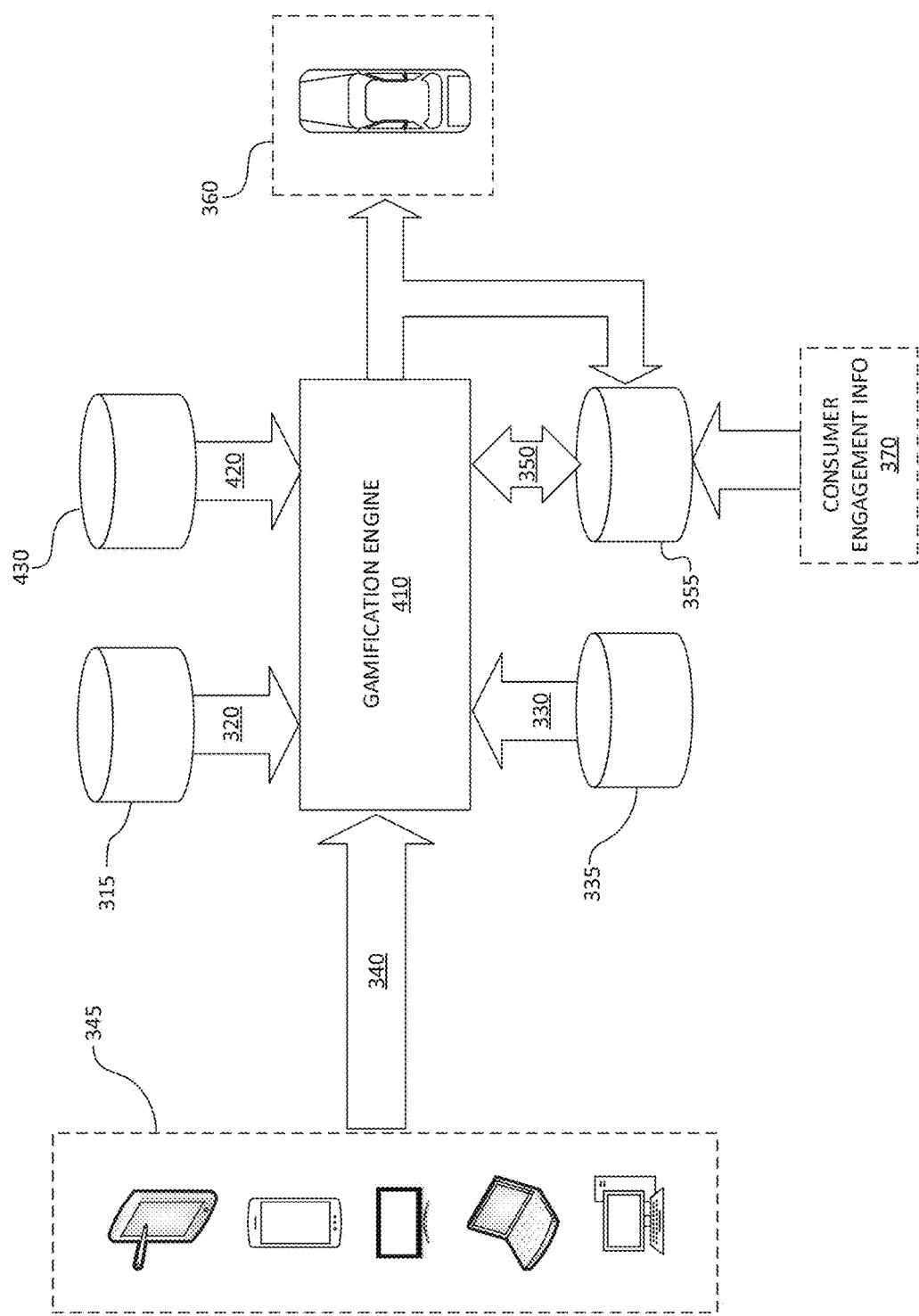
FIG. 4 illustrates another example gamification engine in accordance with embodiments of the technology disclosed herein.

In addition to personalizing the easter egg based on consumer-specific data, a multimedia content distributor may seek to modify the difficulty level of finding the generated personalized easter egg. FIG. 4 illustrates an example gamification engine 410 in accordance with embodiments of the technology disclosed herein. As illustrated in FIG. 4, the gamification engine 410 aggregates similar information as discussed above with respect to FIG. 3. In addition, the gamification engine 410 may take into consideration a difficulty variable 420 in generating the personalized easter egg. The difficulty variable 420 enables the gamification engine to generate a personalized easter egg for each consumer that is designed to meet certain system goals.

In some embodiments, the difficulty variable 420 may be "In Content Owned by Consumer," which indicates to the gamification engine that the personalized easter egg should be based on a specific element identified by temporal metadata associated with multimedia content within a consumer's multimedia library, such as the multimedia library discussed above with respect to FIG. 3. Another example type of difficulty variable 420 may be "Easy to Find," which indicates to the gamification engine 410 that the generated personalized easter egg should be based on a temporal metadata tag associated with a large amount of multimedia content, making it easy for the consumer to accomplish the task. Such a difficulty variable 420 may be helpful if the consumer has not before actively engaged in the "game," thereby increasing the chance that the consumer will accomplish the task and possible begin "playing the game." Other non-limiting examples of difficulty variables include: "In Free Content" (content available without purchase); "Difficult to Find" (easter eggs associated with temporal metadata tags included in a small amount of available multimedia content); or "Contained Within [X]" (the specific element is identified by temporal metadata only associated with a specific multimedia content (X)).

In some embodiments, the categories of difficulty variables 420 may be stored in a variable database 430. In other embodiments, the difficulty variable 420 may be set by the multimedia content distributor to achieve particular goals, such as encouraging more consumers to engage with the content further (e.g., "Easy to Find") or getting consumers to view a particular piece of multimedia content (e.g., "Contained Within [X]"). In other embodiments, the gamification engine 410 may employ machine learning, i.e., logic designed to learn from and make predictions on data. For example, the gamification engine 410 may be configured to identify that a consumer who has not previously accomplished a task (i.e., accessed multimedia content containing a previously generated personalized easter egg), then the gamification engine 410 can apply the "Easy to Find" difficulty variable 420 to generate a personalized easter egg that is easy for the consumer to find. As another example, if the consumer engagement info indicates that the consumer actively engages in finding generated easter eggs, the gamification engine 410 can apply the "Difficult to Find" difficulty variable 420, increasing the difficulty to entice the consumer to engage even further with the multimedia content.

The different databases discussed above with respect to FIGS. 3 and 4 may be combined into a single hardware or software database, or a series of hardware or software databases.

Figure 5:
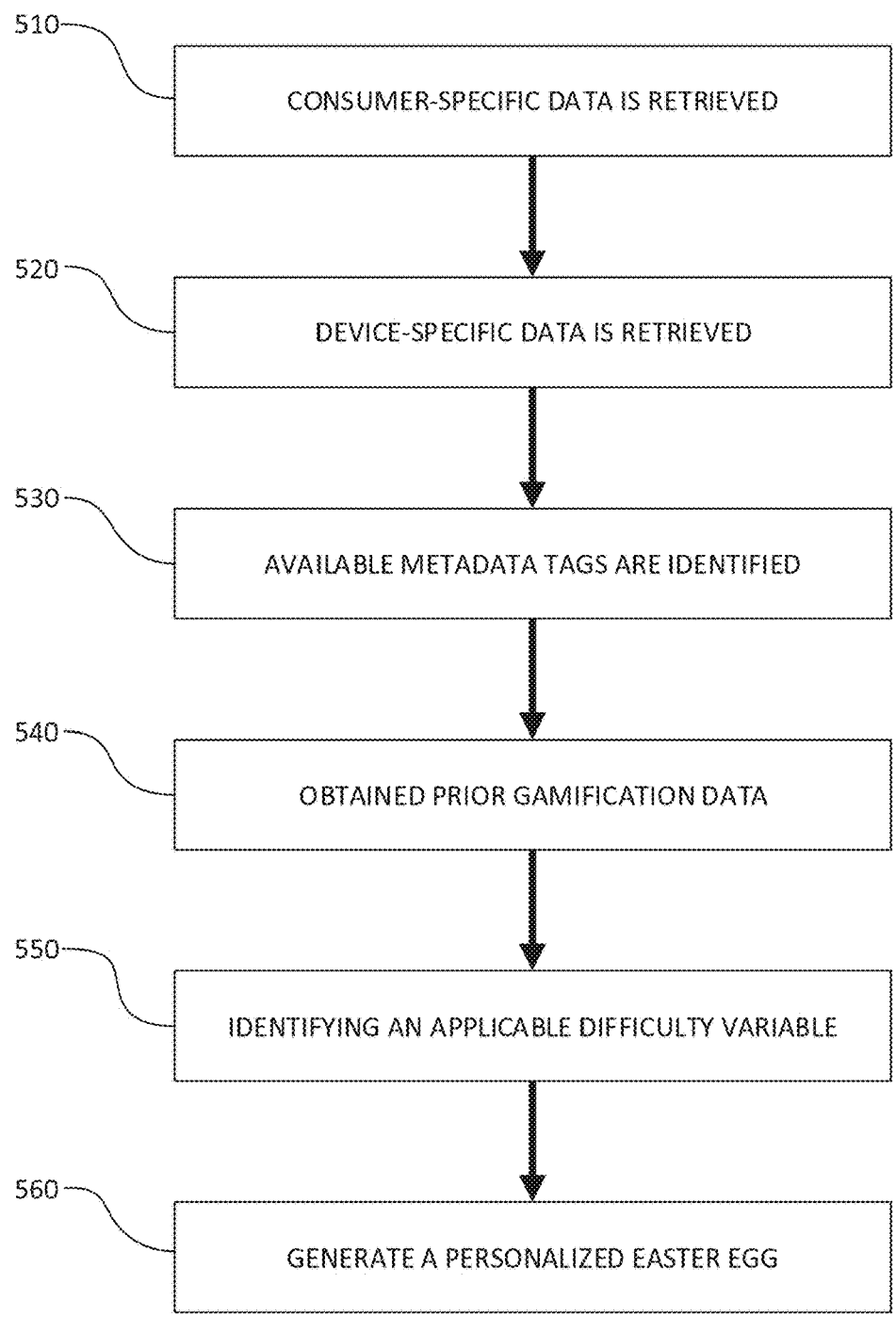
FIG. 5 illustrates an example easter egg generation process in accordance with embodiments of the technology of the present disclosure.

FIG. 5 illustrates an example easter egg generation process 500 in accordance with embodiments of the technology disclosed herein. At 510, consumer-specific data is retrieved. In various embodiments, the consumer-specific data is retrieved by a gamification engine. The gamification engine at 510 may be similar to the gamification engine discussed above with respect to FIGS. 3 and 4. The consumer-specific data retrieved may be similar to the consumer-specific data discussed above with respect to FIG. 3. The consumer-specific data may be retrieved from a consumer data database associated with the multimedia content distribution system or from a portion of memory of a user device allocated to a multimedia application. In some embodiments, the consumer-specific data is sent to the multimedia content distribution system by the multimedia application running on the user device associated with the consumer.

At 520, device-specific data is retrieved from user device associated with the consumer. The device-specific data retrieved may be similar to the device-specific data discussed above with respect to FIG. 3. In some embodiments, the device-specific data may be retrieved by the gamification engine. In other embodiments, the multimedia application may push the device-specific data to the multimedia content distribution system.

At 530, available metadata tags are identified. In some embodiments, the available metadata tags are pulled by a gamification engine from a category database. In other embodiments, the available metadata tags are parsed by the gamification engine using a temporal metadata parser included within the gamification engine. The available metadata tags identify the specific elements of multimedia content identifiable based on temporal metadata tags included in the multimedia content.

At 540, prior gamification data is obtained. The prior gamification data may be similar to the prior gamification data discussed above with respect to FIG. 3. In some embodiments, the prior gamification data may be retrieved by the gamification engine from a history database, similar to the history database discussed above with respect to FIG. 3. In this way, the gamification engine can utilize information related to the consumer's interaction with previously generated easter eggs.

At 550, an applicable difficulty variable is identified. In some embodiments, the applicable difficulty variable may be identified by the multimedia content distributor. In other embodiments, the applicable difficulty variable may be identified by the gamification engine, in a similar manner as discussed above with respect to FIG. 4 (i.e., machine learning). For example, the gamification engine may analyze the consumer engagement data obtained and determines an engagement level associated with the consumer. As discussed above with respect to FIG. 4, the difficulty variable provides context to the gamification engine for generating a personalized easter egg that meets some operational goal of the multimedia content distributor. For example, the difficulty variable may be designed to make it easy for a consumer to begin "playing the game" (i.e., "Easy to Find") where the gamification engine determines that the consumer has a low engagement level, ensure the easter egg is generated to be discoverable in specific multimedia content (e.g., "In Content Owned by Consumer," "In Free Content," "Contained Within [X]") where the engagement level indicates that the consumer is finding personalized easter eggs mainly in a particular type of content, or to challenge a consumer who is actively engaged (i.e., "Difficult to Find") where the consumer engagement level is high, or other multimedia content distributor goals.

At 560, a personalized easter egg is generated. Generation takes into account all the data types aggregated by the gamification engine, such as those data types identified with respect to 510-550. In some embodiments, the generated personalized easter egg may be presented to the consumer when the consumer accesses the multimedia application running on a user device. In various embodiments, the easter egg may be stored in the history database, as part of the prior gamification data and for use later by the gamification engine in generated subsequent personalized easter eggs.

Figure 6:
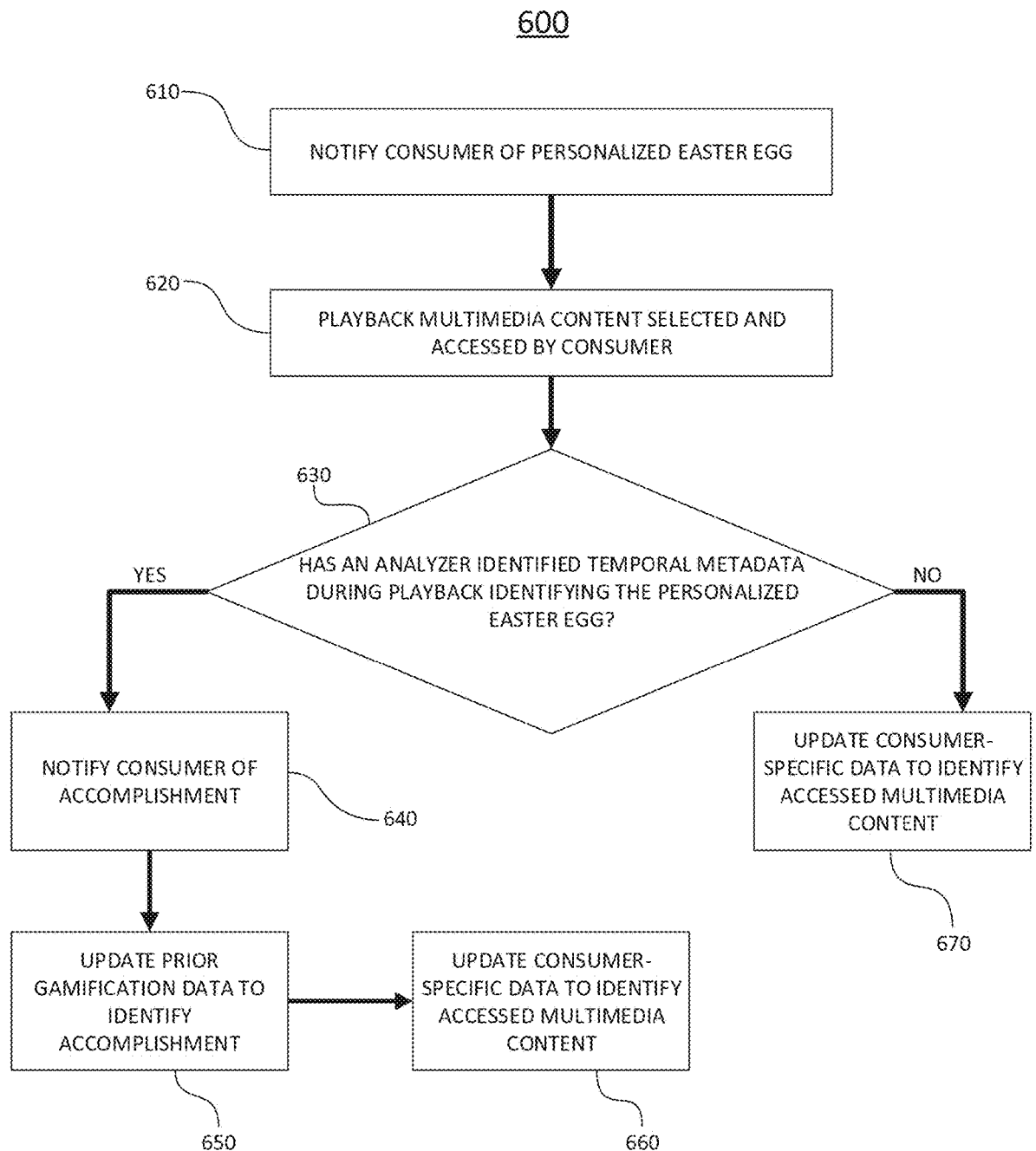
FIG. 6 illustrates an example gamified experience process in accordance with technology of the present disclosure.

FIG. 6 illustrates an example gamified experience process 600 in accordance with embodiments of the technology disclosed herein. At 610, the consumer is notified of a personalized easter egg. The personalized easter egg may be generated in accordance with the process discussed with respect to FIG. 5 in various embodiments. The consumer may be notified of the personalized easter egg in some embodiments via an icon on a main screen of a multimedia application through which the consumer accesses the multimedia content distribution system. In some embodiments, a notification may be sent to the consumer through one or more different messaging forms, including but not limited to email, SMS or MMS messaging, or in-application notifications. In some embodiments, the notification may include an indication of the reward attainable by "playing the game" and accessing multimedia content containing the personalized easter egg.

At 620, the multimedia content selected and accessed by the consumer is played back to the consumer. In various embodiments, playback of the multimedia content is performed via a streaming engine, similar to the streaming engine discussed above with respect to FIG. 2.

At 630, a determination is made whether the temporal metadata tag identifying the personalized easter egg is identified within playback of the accessed multimedia content. In various embodiments, an analyzer is included in the multimedia content distribution system to analyze the multimedia content during playback to identify temporal metadata tags. In some embodiments, the analyzer may be included within the streaming engine discussed above at 620.

If the temporal metadata tag associated with the personalized easter egg is identified during playback of the multimedia content, a notification of accomplishment may be sent to the consumer at 640. In some embodiments, the notification may be displayed to the consumer on the screen of the user device through which the multimedia content is accessed. The notification may include, but not limited to, a visual indicator, a textual indicator, or other indication displayed on the screen. In some embodiments, the notification may be sent to the consumer via one or more of email, SMS message, MMS message, or other messaging format.

At 650, the prior gamification data is updated to indicate that the consumer has accomplished the task. The prior gamification data may be similar to the prior gamification data discussed with respect to FIG. 5 and/or the prior gamification data discussed with respect to FIG. 3. In some embodiments, the prior gamification data may be updated to indicate that the consumer accessed multimedia content containing the easter egg. In some embodiments, the prior gamification data may be updated to include an indication of the particular multimedia content accessed. In some embodiments, the updated prior gamification data may be sent to a history database. At 660, the consumer-specific data may be updated to identify the accessed multimedia content.

If the multimedia content accessed is analyzed and completes playback without the temporal metadata tag associated with the personalized easter egg being identified, an update of the consumer-specific data to identify the accessed multimedia content at 670. As the personalized easter egg was not contained within the accessed multimedia content, no update to the consumer engagement data is necessarily needed. In some embodiments, the consumer engagement data may be updated to indicate the multimedia content accessed and the fact that the personalized easter egg was not included, and therefore the task was not accomplished.

Figure 7:
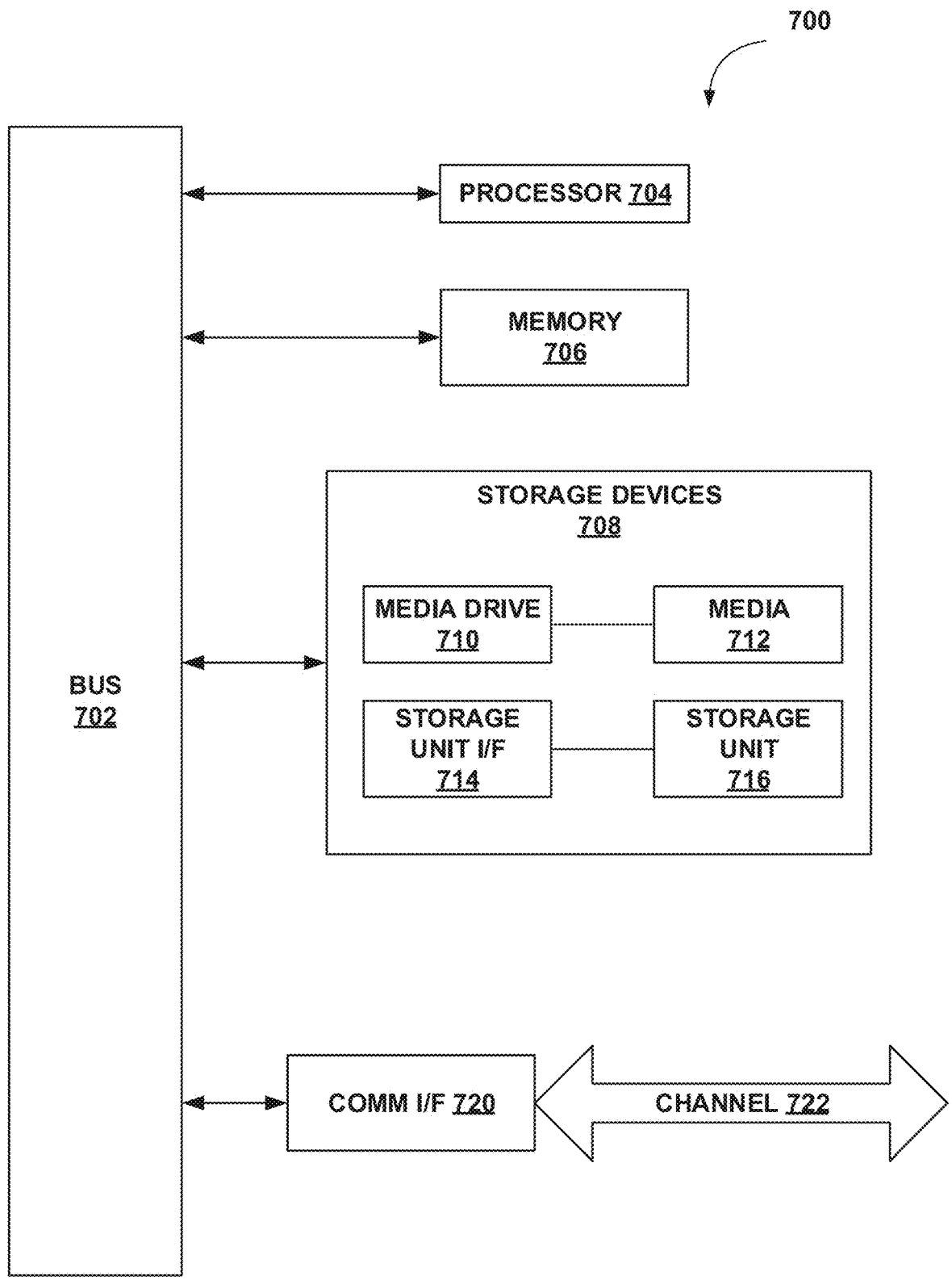
FIG. 7 illustrates an example computing component that may be used in implementing various features of embodiments of the disclosed technology.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the technology are implemented in whole or in part using software, in one embodiment, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the technology using other computing components or architectures.

Referring now to FIG. 7, computing component 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 700 might include, for example, one or more processors, controllers, control components, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing component 700 or to communicate externally.

Computing component 700 might also include one or more memory components, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot, a PCMCIA slot and card, and other fixed or removable storage units 722 and interfaces 720 that allow software and data to be transferred from the storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method of personalized gamification of multimedia content, the computer-implemented method comprising:

retrieving, from a database, consumer-specific data for a consumer accessing a multimedia content distribution system through a multimedia application running on a consumer device, wherein the consumer-specific data comprises biographical information of the consumer and viewing habits of the consumer;

identifying metadata tags associated with a library of multimedia content associated with the consumer and accessible within the multimedia content distribution system, wherein the metadata tags comprise temporal metadata identifying content elements depicted in the library of multimedia content;

obtaining, from the database, prior gamification data indicative of prior actions of the consumer within the multimedia content distribution system in finding and accessing content depicting prior content elements personalized for the consumer;

generating, by operation of one or more processors when executing a gamification engine of the multimedia content distribution system, a content element personalized for the consumer based on the biographical information and the viewing habits, wherein the content element is personalized based on the metadata tags, and wherein generating the content element includes:
 identifying an engagement level of the consumer based on the prior gamification data; and
 implementing, using machine learning based on the engagement level, a difficulty level associated with the consumer, wherein a higher engagement level results in a greater difficulty level being implemented, and wherein the greater difficulty level is reflected via generation of personalized content elements that are depicted in a smaller amount of content in the library of multimedia content;

after generating the content element, prompting the consumer to perform a task of finding and accessing, in the library of multimedia content, multimedia content scenes depicting the content element personalized for the consumer based on the biographical information and the viewing habits, wherein the content element is not depicted during the prompting;

analyzing, via a temporal metadata analyzer included within the multimedia content distribution system, a multimedia content scene found by the consumer responsive to the prompting, to determine whether a metadata tag identifying the content element is included within the multimedia content scene; and determining that the metadata tag identifying the content element is included within the multimedia content scene and that the consumer has accessed the multimedia content scene.

2. The computer-implemented method of claim 1, wherein identifying the metadata tags comprises retrieving the metadata tags from a category database associated with the multimedia content distribution system.

3. The computer-implemented method of claim 1, wherein identifying the metadata tags comprises parsing the library of multimedia content using a temporal metadata parser.

4. The computer-implemented method of claim 1, wherein implementing the difficulty level further comprises further personalizing the content element based on the difficulty level.

5. The computer-implemented method of claim 1, wherein the difficulty level comprises a preset difficulty level from a multimedia content distributor.

6. The computer-implemented method of claim 1, wherein the prior gamification data comprises one or more of: the prior content elements; time between generation of a prior content element of the prior content elements and the consumer accessing a prior multimedia content scene depicting the prior content element; identification of a prior multimedia content scene accessed by the consumer and depicting the prior content element; or a type of a prior multimedia content scene accessed by the consumer and depicting the prior content element.

7. The computer-implemented method of claim 1, wherein the library of multimedia content comprises one or more of: a television program; a movie; a song; or an album.

8. The computer-implemented method of claim 1, further comprising:
    retrieving, from the database, device-specific data associated with the consumer device; and
    further personalizing the content element based on the device-specific data, the device-specific data comprising one or more of: location data; consumer data stored locally on the consumer device; or information regarding one or more multimedia content stored on the consumer device.

9. The computer-implemented method of claim 1, wherein the consumer is prompted via one or more of: email; in-application notification;
    short message service (SMS); or multimedia messaging service (MMS).

10. The computer-implemented method of claim 1, wherein the consumer device comprises one or more of: a desktop computer; a laptop; a tablet; a cell phone; wearable technology; a smart watch; a personal digital assistant (PDA) device; or a television.

11. The computer-implemented method of claim 1, wherein the biographical information comprises age, gender, multimedia content preferences, non-multimedia content preferences, or a combination thereof, wherein the consumer-specific data further comprises indications of multimedia content contained in the library of multimedia content.

12. A non-transitory computer-readable medium having instructions stored thereon, wherein the instructions are of a gamification engine of a multimedia content distribution system, wherein the instructions are executable to perform operations for personalized gamification of multimedia content, the operations comprising:

retrieving, from a database, consumer-specific data for a consumer accessing the multimedia content distribution system through a multimedia application running on a consumer device, wherein the consumer-specific data comprises biographical information of the consumer and viewing habits of the consumer;

identifying metadata tags associated with a library of multimedia content associated with the consumer and accessible within the multimedia content distribution system, wherein the metadata tags comprise temporal metadata identifying content elements depicted in the library of multimedia content;

obtaining, from the database, prior gamification data indicative of prior actions of the consumer within the multimedia content distribution system in finding and accessing content depicting prior content elements personalized for the consumer;

generating, by one or more computer processors when executing the instructions of the gamification engine of the multimedia content distribution system, a content element personalized for the consumer based on the biographical information and the viewing habits, wherein the content element is personalized based on the metadata tags, and wherein generating the content element includes:
    identifying an engagement level of the consumer based on the prior gamification data; and
    implementing, using machine learning based on the engagement level, a difficulty level associated with the consumer, wherein a higher engagement level results in a greater difficulty level being implemented, and wherein the greater difficulty level is reflected via generation of personalized content elements that are depicted in a smaller amount of content in the library of multimedia content;

after generating the content element, prompting the consumer to perform a task of finding and accessing, in the library of multimedia content, multimedia content scenes depicting the content element personalized for the consumer based on the biographical information and the viewing habits, wherein the content element is not depicted during the prompting;

analyzing, via a temporal metadata analyzer included within the multimedia content distribution system, a multimedia content scene found by the consumer responsive to the prompting, to determine whether a metadata tag identifying the content element is included within the multimedia content scene; and determining that the metadata tag identifying the content element is included within the multimedia content scene and that the consumer has accessed the multimedia content scene.

13. A system of personalized gamification of multimedia content, the system comprising:
    one or more computer processors;
    a memory containing a program comprising a gamification engine of a multimedia content distribution system, wherein the program is executable by the one or more computer processors to perform an operation comprising:
        retrieving, from a database, consumer-specific data for a consumer accessing the multimedia content distribution system through a multimedia application running on a consumer device, wherein the consumer-specific data comprises biographical information of the consumer and viewing habits of the consumer;

identifying metadata tags associated with a library of multimedia content associated with the consumer and accessible within the multimedia content distribution system, wherein the metadata tags comprise temporal metadata identifying content elements depicted in the library of multimedia content;

obtaining, from the database, prior gamification data indicative of prior actions of the consumer within the multimedia content distribution system in finding and accessing content depicting prior content elements personalized for the consumer;

generating, by the gamification engine of the multimedia content distribution system, a content element personalized for the consumer based on the biographical information and the viewing habits, wherein the content element is personalized based on the metadata tags, and wherein generating the content element includes:
- identifying an engagement level of the consumer based on the prior gamification data; and
- implementing, using machine learning based on the engagement level, a difficulty level associated with the consumer, wherein a higher engagement level results in a greater difficulty level being implemented, and wherein the greater difficulty level is reflected via generation of personalized content elements that are depicted in a smaller amount of content in the library of multimedia content;

after generating the content element, prompting the consumer to perform a task of finding and accessing, in the library of multimedia content, multimedia content scenes depicting the content element personalized for the consumer based on the biographical information and the viewing habits, wherein the content element is not depicted during the prompting;

analyzing, via a temporal metadata analyzer included within the multimedia content distribution system, a multimedia content scene found by the consumer responsive to the prompting, to determine whether a metadata tag identifying the content element is included within the multimedia content scene; and determining that the metadata tag identifying the content element is included within the multimedia content scene and that the consumer has accessed the multimedia content scene.

14. The system of claim 13, wherein identifying the metadata tags comprises retrieving the metadata tags from a category database associated with the system.

15. The system of claim 13, wherein the gamification engine includes a temporal metadata parser, wherein identifying the metadata tags comprises parsing the library of multimedia content using the temporal metadata parser.

16. The system of claim 13, wherein implementing the difficulty level further comprises further personalizing the content element based on the difficulty level.

17. The system of claim 13, wherein the difficulty level comprises a preset difficulty level from a multimedia content distributor.

18. The computer-implemented method of claim 1, further comprising:
updating the prior gamification data to indicate that the consumer has successfully found and accessed the multimedia content scene.

19. The computer-implemented method of claim 1, further comprising:
formatting, by a streaming engine of the multimedia content distribution system, the multimedia content scene to have an aspect ratio for the consumer device.

20. The computer-implemented method of claim 1, further comprising:
transmitting, by a streaming engine of the multimedia content distribution system, the multimedia content scene to the consumer device for playback.

21. The non-transitory computer-readable medium of claim 12, wherein identifying the metadata tags comprises retrieving the metadata tags from a category database associated with the multimedia content distribution system.

22. The non-transitory computer-readable medium of claim 12, wherein identifying the metadata tags comprises parsing the library of multimedia content using a temporal metadata parser.

* * * * *